Dec. 2, 1969  G. L. AHLSTEDT  3,481,375
APPARATUS FOR MACHINING WOODEN PLANKS
Filed Sept. 20, 1967  2 Sheets-Sheet 1

United States Patent Office 3,481,375
Patented Dec. 2, 1969

3,481,375
APPARATUS FOR MACHINING WOODEN PLANKS
Gunnar Lennart Ahlstedt, Alfredshem, Sweden, assignor to Mo och Domsjo Aktiebolag, Ornskoldsvik, Sweden, a corporation of Sweden
Filed Sept. 20, 1967, Ser. No. 669,226
Claims priority, application Sweden, Sept. 27, 1966, 13,020/66
Int. Cl. B27c 1/12
U.S. Cl. 144—121                     10 Claims

ABSTRACT OF THE DISCLOSURE

A chip removal device for machining planks is provided, including means for centering the plank along its center line, and sensing the width of the plank, means for gripping the plank along its center line, such as tongs mounted on a closed conveyor, and conveying said plank laterally to a machining station, where the plank is subjected to suitable working operations, in relation to its width, along its one edge, and means for correspondingly working the other edge of the plank.

---

The present invention is concerned with chip removal means for machining wooden planks and is intended to provide a means for this purpose which is less bulky and which requires less manual attention than hitherto known apparatus.

The plank is usually moved longitudinally when being machined. This, for instance, is the case when edging planks; an operation in which a saw trims the edge of the plank whilst the plank is moved in its longitudinal direction. Consequently, high conveying speeds are necessary in order to reach the desired cutting efficiency, which involves a high power consumption for the conveying means. Further, the length of the apparatus must be relatively extensive in the direction in which the plank is conveyed. Moreover, known apparatus require a great deal of care and attention whilst in operation.

The present in vention is primarily based upon the conception that the plank should be advanced laterally, whilst being worked, whereby the conveying speed at the same cutting efficiency can be kept lower and the total length of the apparatus can be reduced considerably, in addition to which machining of the plank can be effected simultaneously along the total length of the plank; a feature which contributes towards a high cutting efficiency.

The apparatus according to the invention includes means for centering the plank along its center line and sensing its width for gripping the plank along its center line and conveying said plank laterally to a working station at which the plank is subjected to a suitable machining operation, in relation to its width, along its one edge by means of chip removing tools and means for machining in a corresponding manner the other edge of the plank.

Figure 1:
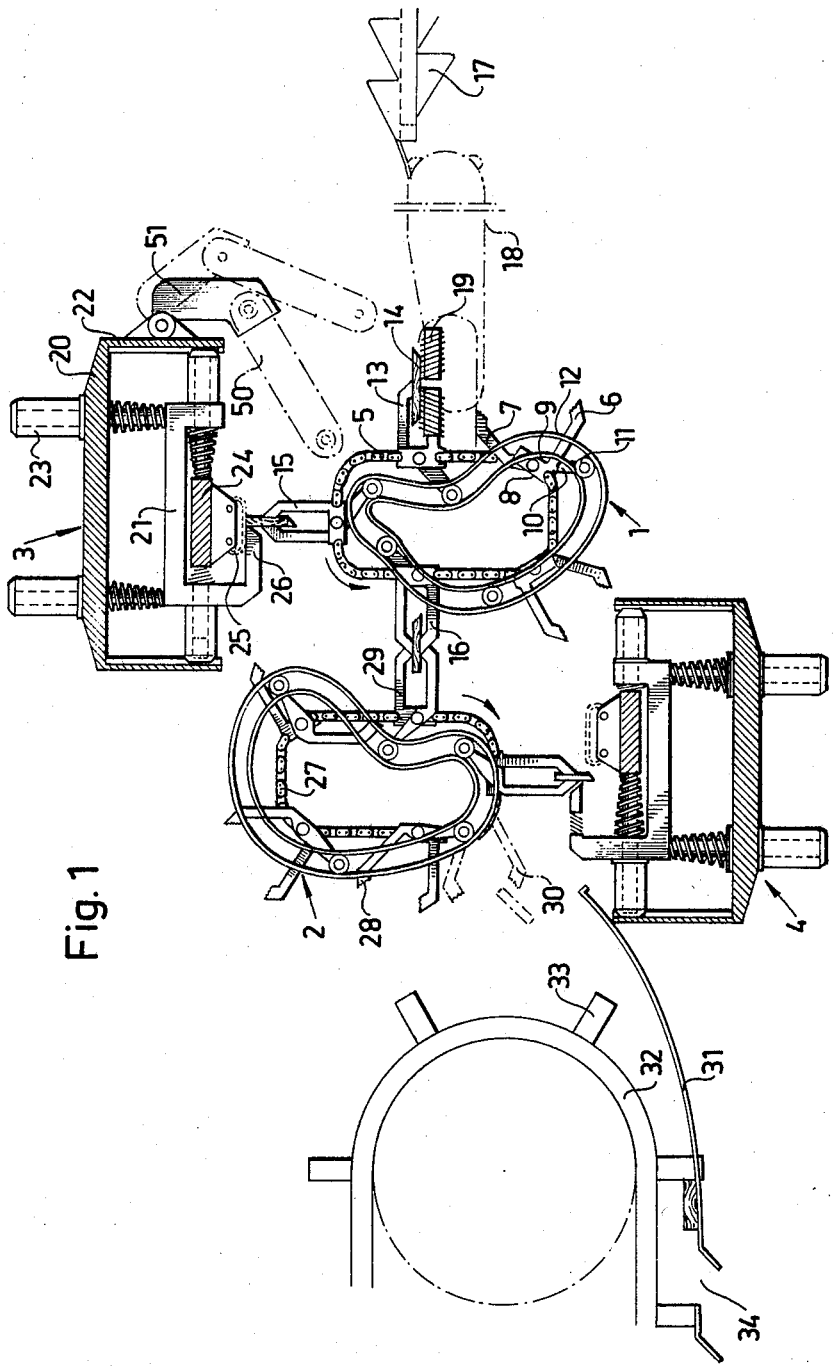
Figure 2:
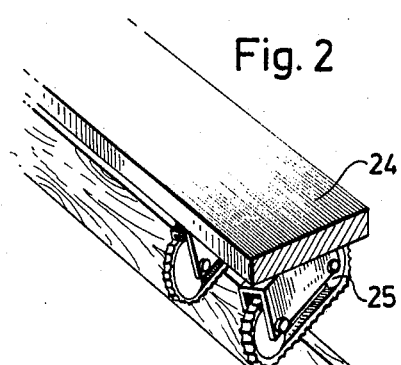
Figure 3:
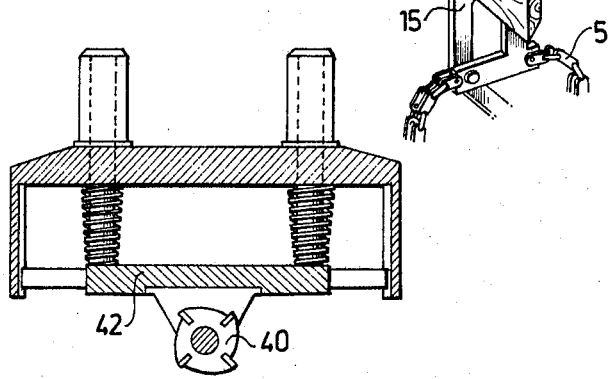

The invention will now be described with reference to accompanying drawings, wherein FIGURE 1 shows diagrammatically an apparatus according to the invention in side view, FIGURE 2 shows a modified detail of the apparatus and FIGURE 3 is a perspective view of a tool. For the sake of simplicity FIGURE 1 only illustrates the essential components of the apparatus, whilst such components as the frame, drive means etc. have been omitted. Naturally, it is within the scope of those skilled in the art to design such details in the most expedient manner.

The essential members in the apparatus shown in FIGURE 1 comprise of two conveying means 1, 2 and two working or machining stations 3, 4, in which first one edge of the plank and then its other edge are worked.

The conveying means 1 includes an endless chain 5, which is driven by means (not shown) stepwise or continuously in a counter clockwise direction in FIGURE 1. The chain 5 carries a number of tong-like gripping means each including two legs 6, 7 of which the first is rigidly connected to a link 8 of the chain so that during movement of the chain the link is constantly projected forwards, essentially perpendicular to the chain. The second link 7 which is preferably resiliently supported is pivotally connected at 9 to the link 8 and presents a backwardly and outwardly projecting arm 10, in which a roller 11 is secured. The roller 11 runs in a curved track 12 which controls the opening and closing of the tongs by causing the pivotal leg 7, during movement of the chain, to swiing relative to the link 8, and thereby in relation to the leg 6. More specifically, the track 11 is designed so that the tongs 6, 7 are closed in the position 13 so as to grip a plank 14; in that the rigidly secured leg 6 will engage the bottom surface of the plank and then the moveable leg, which in its raised positions has passed the adjacent edge of the plank, is dropped down against the upper surface of said plank. The tongs are held closed while the plank carried by the chain is moved through more than half its path, to position 15 corresponding to the working station 3 and to position 16 which is located approximately opposite the position 13, where the curved track causes the roller 11, and thereby the leg 7, to execute such a movement that the tongs are opened, whereafter the open tongs pass through the lower portion of their path to once again reach the position 13. It is, of course, possible to provide the relative movement of leg 7 with respect to leg 6 by other means than mechanical, e.g. by means of electromagnets.

As previously mentioned the plank is gripped at position 13. The planks are fed one at a time to this position by means of appropriate conveying devices indicated at 17, 18 and are centered by means of a centering device 19, so that the center line of said plank lies at the center of the gripping surfaces of the legs 6, 7. The centering device 19 may be of the type more clearly defined in copending patent application Ser. No. 669,208 filed Sept. 20, 1967 and now allowed. The disclosure of this application is incorporated herein by reference and thus the centering means need not be described in detail. The operation of the conveying means 1 is adjusted to the action of the centering device 19 so that the plank is not gripped until it has been centered. The centering device 19 may also serve to measure the width of the plank, or the width of the plank can be measured by special measuring instruments. The width measurement may then be used in the machining operation to achieve the best possible yield.

Naturally, at least two conveying means 1 are arranged for gripping the plank e.g. in the proximity of its two ends, and if long planks are to be worked one or more intermediate conveying means may also be arranged. All conveying means are synchronized so that they grip and release the plank simultaneously. This can be easily done by merely positioning the tong-like gripping means 6 and 7 of the first conveyor in the position shown in FIGURE 1 at 16 and at the same time positioning the tong-like gripping members of the second conveyor in the position shown at 29 in FIGURE 1 prior to starting operation of the drive mechanism. This will insure synchronization of the two conveyors. The centering devices 19 are suitably arranged near each end of the plank so that it can be aligned along the whole of its length, and the width is determined at the two ends.

The working station 3 is provided with tools for cutting the one edge of the plank. A stationary frame 20 supports a holder 21 so that it is capable of moving vertically in guides 22, through the medium of hydraulic cylinders 23, for instance. The holder 21 supports in turn a reciprocatingly movable tool holder, 24, e.g. in the form of a bar, which in its turn carries a series of tools 25 which in the shown instance are comprised of chain-like cutters. The tool holder 24 and the tools 25 are reciprocated lengthwise along the edge of the plank as shown in FIGURE 2, and this can be done by any suitable drive mechanism. The cutters are positioned obliquely to the long direction of the bar so that each tool when displaced laterally cuts across a short portion of the plank edge. The tools are positioned so that the working areas of adjacent tools partly overlap one another, whereby together they machine the whole length of the plank. The holder 21 presents an abutment means 26 against which the plank lies during the working operation.

The depth to which the tools cut the plank is determined in relation to the measured width of said plank, and the measured value is fed to an arrangement which controls the vertical displacement of the holder 21 so that the plank is machined to the extent required. The means for measuring the width of the plank is preferably combined with the means for centering the plank as described in my copending application Ser. No. 669,208 referred to above. The measured value determined by the apparatus can then be used to electrically control a drive mechanism (not shown) which moves the cutters toward or away from the edge of the plank by means of the hydraulic cylinders 23. A suitable time delay is introduced so that the measured value, determined for a certain plank in the gripped position at 13, actuates the tool when the same plank is at position 15. With regard to this action of the machining tools it is important that the center line of each plank lies in a predetermined position at the working station 3 so that the plank is machined according to requirements, wherefore the plank must be gripped as accurately as possible at its center line.

When one edge of the plank has been machined in the manner described the plank is moved to position 16 where the tongs open, as previously described. The plank is at the same time transferred to the second conveying means 2. This is substantially of the same construction as the conveying means 1, although arranged so that its chain 27 and tongs rotate clockwise instead of counterclockwise. As in the case of the conveying means 1 one or more additional conveying means 2 are provided for gripping the plank at several points along its length, although only one is shown in the described embodiment.

The curved track 28 of the conveying means 2 is so designed that the tongs are closed in a position 29 in which the tongs face towards the tongs of the first conveying means at position 16, although somewhat displaced laterally relative to the same. The distance between the conveying means is so arranged that the center of the gripping surfaces of the tongs 29 coincides with the center line of the plank, so that the plank is regripped at its center portion. The movements of the two conveying means are synchronized so that the tongs 29 are closed around the plank immediately before the tongs 16 open. The plank is transferred in this manner to the second conveying means and is moved by said means to the machining station 4 where its other edge is cut, in the manner described. During the continued movement the tongs are opened owing to the operation of the roller track 28 at the position 30, indicated by dash-dot lines, the plank being released. The tongs continue to move in their open state until they reach position 29, where they are reclosed and engage another plank.

The working tools at station 4 are arranged in the same way as at station 3 and need not be described in detail. It will only be mentioned that the work carried out by the tools is controlled by the measured value which is fed to control means of the tool after a delay in time so determined that each measured value controls the tool when the corresponding plank is in the working position. In this way the edge of the plank is machined to a point located at the same distance from the center line as in station 3.

The machined planks fall on to an inclined surface 31, to a sorting arrangement in the form of a conveyor 32 presenting dogs 33 which feed the planks over a number of pockets 34 of different widths, so that the planks are sorted according to width.

Figure 4:
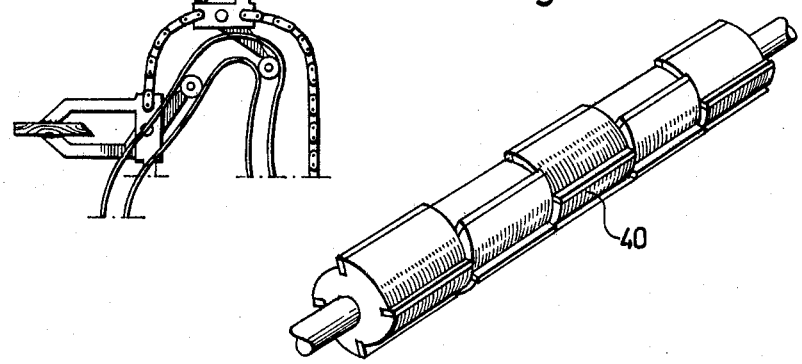

The apparatus according to FIGURES 3 and 4 differs from the apparatus described above in that the tool is comprised of an elongated rotary cutter 40 arranged to work the edge of the plank along its whole length, while the plank is conveyed securely gripped by the tongs 41. The cutter 40 is attached in a vertically movable holder 42, in the same way as in the embodiment previously described.

If required, a tool for cutting the plank to a certain desired length can be provided in the working station 3, such as shown in FIGURE 1. In this instance the cutting tool is constituted of a chain saw 50 mounted in a holder 51 pivotally secured at the frame 20. In its forward pivoted position the saw 50 cuts the plank as it passes from position 14 to position 15.

I claim:

1. An apparatus for machining, in sequence, the side edges of planks comprising, in combination, first gripping means for engaging and retaining the sides of a plank in a manner such that at least one side edge of the plank is exposed for machining; a first conveyor associated with the first gripping means adapted to move the plank laterally in one direction while engaged by said first gripping means; a machining station disposed adjacent to the conveyor and positioned such that the exposed edge of the plank can be machined when the plank is conveyed past the machining station; second gripping means for receiving the plank from the first gripping means after machining of the first side edge of the plank and adapted to grip the sides of the plank so that a second side edge of the plank is exposed for machining; and second conveying means associated with the second gripping means for moving the plank laterally while engaged by the second gripping means so that the second side edge of the plank can be machined while retained by the second gripping means.

2. An apparatus in accordance with claim 1 including means for centering the plank in relation to a given reference point prior to its engagement by the first gripping means such that the gripping means engages the plank at a point between its side edges.

3. An apparatus in accordance with claim 2 in which the second conveyor moves the plank in the same direction as the first conveyor.

4. An apparatus in accordance with claim 1 in which the first and second gripping means each comprise a pair of tong-like grippers.

5. An apparatus in accordance with claim 4 in which the tong-like grippers are mounted for movement with the conveyor; and in which the conveyor is formed in a closed configuration; and guide means positioned adjacent to the conveyor and adapted to open and close the grippers according to the position of the grippers.

6. An apparatus in accordance with claim 5, in which the guide means comprises a curved track; and in which one of the pair of grippers is fixed relative to the conveyor and the other gripper of the pair is pivotally mounted relative to the fixed gripper, and said pivotally mounted gripper has a control member which travels in the track.

7. An apparatus in accordance with claim 1 in which the machining station has cutters which are reciprocably mounted for movement along the length of the plank.

8. An apparatus in accordance with claim 1 including a second machining station located adjacent the second conveyor in a position to machine the second edge of the plank.

9. An aparatus for machining the side edges of planks comprising, in combination, gripping means for engaging and retaining the sides of a plank, means for positioning the plank in relation to a given reference point prior to its engagement by the gripping means such that the gripping means engages the plank at a selected position between its side edges; a conveyor associated with the gripping means and adapted to move the plank laterally in one direction while engaged by said gripping means; a machining station disposed adjacent to the conveyor and positioned such that a first side edge of the plank can be machined when the plank is conveyed past the machining station; means for receiving the plank from the gripping means after machining of the first side edge of the plank; and means for machining a second side edge of the plank.

10. An apparatus in accordance with claim 9 in which the means for positioning the plank also is adapted to determine the width of the plank, said means being associated with the machining station such that the depth to which the side edge of the plank is machined is controlled according to the width of the plank.

References Cited

UNITED STATES PATENTS

| | | | |
|---|---|---|---|
| 667,981 | 2/1901 | Jorres | 144—154 X |
| 2,559,378 | 7/1951 | Stalder | 144—242 X |
| 2,901,010 | 8/1959 | Dalton et al. | 144—154 |
| 2,936,007 | 5/1960 | Palm. | |
| 2,948,897 | 8/1960 | Sherwood | 144—154 X |

GIL WEIDENFELD, Primary Examiner

U.S. Cl. X.R.

144—39, 154, 242